March 9, 1937.  M. M. SCHWARZSCHILD  2,073,457
DIAGNOSTIC INDICATOR
Filed Sept. 14, 1934
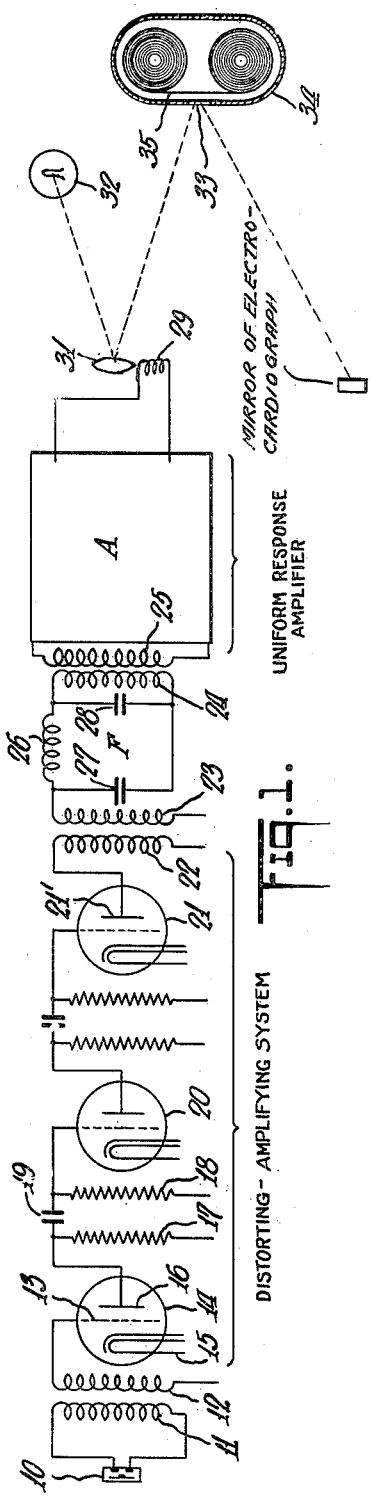
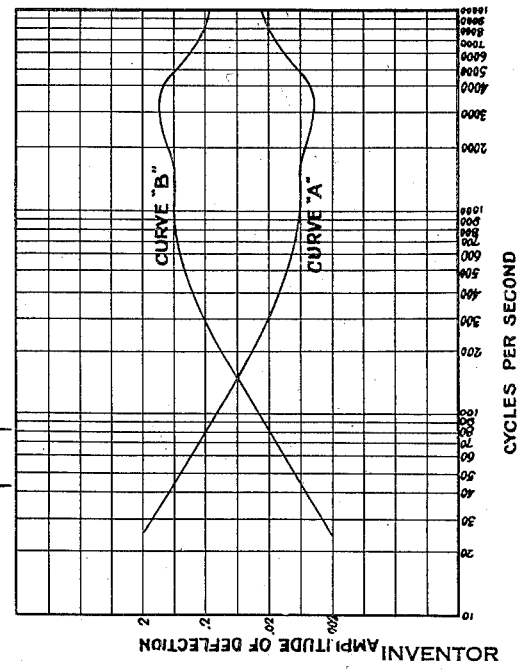
INVENTOR
Myron M. Schwarzschild
BY
Dean, Fairbank, Hirsch & Foster
ATTORNEYS Patented Mar. 9, 1937

2,073,457

UNITED STATES PATENT OFFICE 2,073,457

DIAGNOSTIC INDICATOR

Myron M. Schwarzschild, Brooklyn, N. Y.

Application September 14, 1934, Serial No. 744,028

6 Claims. (Cl. 128—2.05)

My present invention relates to apparatus for facilitating cardiac diagnosis.

As conducive to a clear understanding of the invention, it is noted that for generations the stethoscope has been primarily used for cardiac diagnosis and the skill of the diagnostician in such auscultation has rendered possible to a degree, the interpretation of the pulsations as indications of the precise functional condition of the heart.

A grave limitation of auscultation is the substantial impossibility of determining the timing of the various pulsations and frequently, of making the vital determination of whether a noticeable murmur occurs in the systolic or the diastolic phase.

While, with the use of known amplifying and recording equipment, the actual vibrations of the heart can be readily and visibly recorded by means of an oscillograph, such records are of little help in diagnosis. This is accounted for by the substantially uniform efficiency of such amplifiers, throughout the range of frequencies, resulting in a record which apparently does not correspond at all to what is heard in auscultation, considering the typical imperfections of human hearing. Such record would, in general, emphasize the fundamentals as major deflections or pulsations, but since these fundamental frequencies are below the range of audibility, they would not be noticeable in auscultation; while minor humps in many cases almost invisible on the fundamentals in such records, correspond to those frequencies that are mainly heard on the stethoscope.

Moreover, those frequencies that are actually heard by the diagnostician have apparent relative intensities that differ widely from their actual relative intensities, as they would be recorded on an ordinary oscillograph.

Among the objects of the present invention are to provide an oscillograph record, corresponding with substantial accuracy to the imperfect auditory impression derived in auscultation, and which, in particular, will record each pulsation, sound or murmur detected by the ear and substantially eliminate any and all vibrations not detectable by the ear, and which, moreover, will afford a sharp indication of the precise time and time intervals between various pulsations or murmurs and the precise duration of each of them.

Another object is to produce an oscillograph record of the above type with the use of apparatus, the constituent elements of which are quite conventional and by resort to a technique readily developed by one reasonably skilled in the art.

A feature of the invention is the use of a coupling system between the stethoscope and the recording system with constants so selected as substantially to suppress frequencies outside of the range of audibility and substantially to compensate for the lack of uniformity of the human ear in its sensitivity to different sound frequencies, with the ultimate objective of effecting a record showing substantially equal amplitude for sounds that appear to the human ear as having equal loudness. While in the broadest aspect of the invention, this feature can be embodied in a mechanical system, it is preferred to employ an audio amplifying system, with a microphone stethoscope such as an electromagnetic, an electrostatic or a piezoelectric unit, with a suitable oscillograph, all correlated as immediately above set forth.

In the accompanying drawing, in which is shown one of various possible embodiments of the several features of the invention:

Fig. 1 is a purely diagrammatic view indicating one of various possible installations for carrying out the invention, the camera appearing at right angles to its proper position for clearer showing.

Fig. 2 is a graph showing the character of compensation performed by my apparatus, and Fig. 3 is a record of the operation of a heart having one type of defect.

Fig. 1 shows in a purely diagrammatic manner a merely illustrative circuit diagram of one apparatus in which the invention may be embodied and which naturally includes two parts. The first part is the distorting-amplifying system in which is embodied the essential novelty of the present invention. The second part is the uniform response amplifier, which may be strictly conventional in character and from which the oscillograph is operated. At 10 is shown the conventional electromagnetic stethoscope to be strapped to the subject's chest, although an equivalent microphone stethoscope could be used. It is connected to the primary 11 of the transformer, the secondary 12 of which is connected to the grid 13 of an amplifier tube 14 having a filament 15 and coupled at the plate 16 thereof, preferably by resistance capacity coupling to the next amplifier tube 20. The coupling, as shown, comprises a pair of fixed resistances 17 and 18 with an intervening fixed capacity 19. Of course, equivalent inductive or transformer coupling could be used. For practical purposes, three stages of amplification involving the amplifying tubes 14, 20 and 21 are sufficient for the purpose and such stages may be identical, as shown, each coupled to the next by equivalent resistance capacity coupling.

While the desired distortion characteristics may be obtained as is obvious to those skilled in the art, by any of numerous selections of tubes and constants, I have found that an entirely practical result for my purpose is obtained, by using tubes of the construction known as 56's, all of approximately identical characteristics, with plate resistances 17, say of 10,000 ohms each. The desired distortion may be accomplished by using as the condensers 19 very small fixed coupling units (.0015 mf.) and relatively low grid resistances 18 of 100,000 ohms. In this way the efficiency of coupling between any two stages varies substantially directly with the frequency.

With the specific arrangement illustratively shown, the output of the third tube 21 will be found to be relatively poor in low frequencies and very high in the higher frequencies. Up to about 500 cycles, the distortion characteristic of the combination set forth is almost exactly what is desired, but above this point the gain is somewhat too great.

Since frequencies above 1000 are not important for present purposes, firstly because there are practically no heart sounds of such period, and secondly because a practical speed of recording would necessitate records of unwieldy dimensions, it is feasible to use a thousand cycle low pass filter with a fairly round cut off, which will serve adequately to reduce the excessive gain between 500 and 1000 cycles, thereby improving the net result and will cut out the useless frequencies above 1000. This low pass filter F may be of conventional construction, supplied from a secondary transformer coil 23, the cooperating primary 22 for which is fed from the plate 21' of tube 21. The output of the filter is fed to the primary 24 of a transformer, the secondary 25 of which delivers to the uniform response amplifier A, which may be entirely conventional and the details of which are accordingly not shown. The filter, of course, includes the conventional coil 26 and the fixed capacity condensers 27 and 28 extending across the coils 23 and 24.

The output of the amplifier A feeds the coil 29 of an electrical oscillograph which is conventional and indicated merely diagrammatically, and includes a mirror 31 upon which light from a lamp 32 is projected and reflected to preferably the right side of the slit 33 in a camera 34 carrying the moving oscillograph film 35.

The electro-cardiograph the mirror of which is diagrammatically shown at 36 is also applied to the subject, and records concurrently through the left side of the slot 33 on the same film.

Fig. 2 is a diagram showing what is called the frequency-audition curve. On this, cycles per second of the pitch or frequency of the sound are noted upon the abscissa. The ordinates show the corresponding amplitude of deflection which would be registered by a distortionless sound pressure indicator. The curve A defines the imperfections of the human ear according to which sounds of equal absolute intensity appear to be louder or less loud depending upon the pitch. The curve A, therefore, represents the measure of variation of the sensitivity of the ordinary human ear for various frequencies or pitches. It is the sharp variations in deflection of the oscillograph, giving in some instances dominating prominence on the record to vibrations that may be almost, if not quite inaudible to the listener, which accounts largely for the substantial worthlessness of true oscillograph records where an immediate comparison with the subjective auditory impression is desired.

In curve B, on Fig. 2 is shown the reciprocal of curve A. The constants of the amplifying circuit shown in Fig. 1 that is, the various resistances 17, 18 and capacitances 19 are so selected as to produce an overall amplifying effect at various frequencies corresponding roughly to curve B. The selection of these fixed resistances and capacitances may be readily determined by computation, or if desired, empirically. For practical purposes, the result need merely be approximate, mathematical precision being unnecessary and the specific selection of resistances and capacities above set forth will suffice for practical purposes in the distorting-amplifying system.

It is, of course, obvious that any of a wide variety of systems, amplifying or otherwise by which this selective distortion might be introduced within the scope of the present invention could be used and that any of numerous possible selections of constants to bring about the substantially uniform response for sound appearing to have uniform loudness could be employed within the scope of my invention in its broadest aspects.

In Fig. 3 is shown a record as produced by a heart having one type of a defect. In the electro-cardiogram 39, the R and T waves respectively at 40 and 41 clearly appear, and serve as points of reference for timing the sound record on the graph below. The electrocardiographic R and T waves as understood by those skilled in the art are electric manifestations of the impulses travelling through the ventricle system of the heart. In the normal heart, the first sound varies between .04 and .12 second in duration, the second sound between .04 and .06 second in duration. The frequencies of sound are mixed, the dominant frequencies ranging between 50 and 300 cycles a second. The first sound generally shows one to three low amplitude, low frequency vibrations, followed by a higher frequency component, which, in turn, is followed by a decrescendo, usually of lower frequency than the major component. This is in strict correlation with the auscultatory finding.

It will be noted that in the systolic phase represented at 43, which generally starts on the downstroke of the R wave, there is a first sound 43' and during the diastolic phase 44 there is recorded the second sound $44^2$ and an extra sound $44^3$, the latter indicative of pathology. The first sound 43' is shown as a split first sound, that is, one which appears in auscultation to have two successive components. The graphs produced by the installation set forth give a trustworthy, substantially accurate, visual record of each and every vibration heard by the diagnostician and include no record of any vibration inaudible to the diagnostician. The graph, therefore, affords a permanent record which can be studied at leisure by an expert diagnostician without the need for personal contact with the patient. Of course, the graph affords accurate timing relations between the various vibrations and correct sequences of operation, which in many cases cannot be ascertained with any certainty by conventional auscultation.

It will thus be seen that there are herein described, apparatus and methods in which the several features of this invention are embodied, and which in service attain the various objects of the invention and are well suited to meet the requirements of practical use.

As many changes could be made in the above disclosure, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent of the United States is:—

1. In an apparatus for making a visual indication corresponding to the auditory impression in auscultation, said apparatus including a graphic indicator, a sound pick-up, a coupling system interposed between the pick-up and indicator for operating the latter from the former, said system characterized by having its constants co-ordinated with the characteristics of the human auditory system to indicate all sounds of low intensity, appearing to have approximately the same loudness by deflection of approximately the same amplitude.

2. In an apparatus for making a visual indication corresponding to the auditory impression in auscultation, said apparatus being of the type which includes a magnetic stethoscope, an oscillograph, and an audion amplifier system operating the latter from the former; said system characterized by having its constants co-ordinated with the characteristics of the human auditory system to cause the oscillograph to indicate all sounds appearing to have approximately the same loudness by deflection of approximately the same amplitude.

3. In an apparatus for making a visual indication corresponding to the auditory impression in auscultation, said apparatus being of the type which includes a stethoscope, an oscillograph, and an audion amplifier system electromagnetically operating the oscillograph from the stethoscope, said apparatus characterized by the fact that the amplifier has constants to substantially suppress frequencies below and frequencies above the range of audibility and to amplify frequencies in the range of audibility, to degree varying with the frequency.

4. In an apparatus for making a visual indication corresponding to the auditory impression in auscultation, said apparatus being of the type which includes a stethoscope, an oscillograph and a multi-stage audion amplifier system, said oscillograph being operated from the output of said amplifier system; said amplifier system characterized by having constants such as to cause the deflection of the oscillograph to be approximately the same for sounds appearing to the diagnostician to have substantially the same loudness, whereby the resulting indication will afford a reasonably accurate visual indication of what a diagnostician actually hears, with the elimination of indications corresponding to frequencies not heard by the diagnostician.

5. In an apparatus for making a visual indication corresponding to the auditory impression in auscultation, said apparatus being of the type which includes an amplifier system, a stethoscope operating the latter and an oscillograph operated from said amplifying system; said amplifier system characterized by having its constants substantially the reciprocals of the frequency-audition curve of the normal human ear.

6. In an apparatus for making a visual indication corresponding to the auditory impression in auscultation, said apparatus being of the type which includes an oscillograph and an amplifier system therefor, said amplifier system having its constants substantially the reciprocals of the frequency audition curve of the normal human ear up to approximately 500 cycles and having an excessive gain beyond approximately 500 cycles, a low-pass filter connected to said amplifying system and serving to cut off frequencies substantially above 1000 cycles and to reduce the gain between 500 and 1000 cycles, and a uniform response amplifier connected to said low pass filter and serving to operate the oscillograph.

MYRON M. SCHWARZSCHILD.